(12) United States Patent
Greywall

(10) Patent No.: US 6,351,329 B1
(45) Date of Patent: Feb. 26, 2002

(54) OPTICAL ATTENUATOR

(75) Inventor: Dennis Stanley Greywall, Whitehouse Station, NJ (US)

(73) Assignees: Lucent Technologies Inc., Murray Hill, NJ (US); Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/415,281

(22) Filed: Oct. 8, 1999

(51) Int. Cl.⁷ ............................................... G02B 26/00
(52) U.S. Cl. ...................................... 359/290; 359/291
(58) Field of Search ............................. 359/245, 267, 359/290, 291, 223, 224, 263, 276, 292, 293, 294, 295

(56) References Cited

U.S. PATENT DOCUMENTS

| | | | |
|---|---|---|---|
| 5,589,974 A | * 12/1996 | Gossen | 359/290 |
| 5,654,819 A | * 8/1997 | Gossen | 359/291 |
| 5,684,631 A | 11/1997 | Greywall | 359/565 |
| 5,870,221 A | * 2/1999 | Gossen | 359/290 |
| 5,949,571 A | * 9/1999 | Gossen | 359/291 |
| 6,147,789 A | * 11/2000 | Gelbart | 359/231 |

* cited by examiner

Primary Examiner—Georgia Epps
Assistant Examiner—Tuyen Tra
(74) Attorney, Agent, or Firm—Martin I. Finston

(57) ABSTRACT

An optical attenuator having a structure in which a membrane covers a cavity formed on a substrate is disclosed. The membrane covering the cavity formed in the substrate is movable relative to the bottom surface of the cavity constituting a deformable mirror. Movement of the membrane relative to the bottom surface of the cavity attenuates optical signals impinging on the surface thereof. The movement of the membrane relative to the bottom surface of the cavity attenuates impinging optical signals by controlling the angle at which such impinging optical signals are reflected from the membrane surface.

16 Claims, 2 Drawing Sheets

OPTICAL ATTENUATOR

FIELD OF THE INVENTION

The present invention relates generally to optical communication systems and more particularly to optical attenuators.

DESCRIPTION OF THE RELATED ART

Optical communication systems typically include a variety of optical fiber-coupled devices (e. g., light sources, photodetectors, switches, attenuators, amplifiers, and filters). The optical fiber-coupled devices transmit optical signals in the optical communications systems. Some optical signals that are transmitted in such optical communications systems have many different wavelengths (frequencies). Digital or analog data is transmitted on the different wavelengths of the optical signals.

Many optical communication systems are lossy in that the optical fibers used therein scatter (or absorb) portions of the optical signals transmitted therealong (about 0.1–0.2 dB/km). When portions of the optical signals transmitted on the optical fibers are scattered (or absorbed), the power associated with such optical signals is reduced. To compensate for power reductions attributable to the optical fibers, optical amplifiers are positioned in the optical communication system. The optical amplifiers increase the power of the optical signals transmitted along the optical fibers.

After the optical signals propagating along the optical fiber experience multiple cycles of power losses followed by amplification, power variations between the different wavelengths of the optical signals potentially occur. If not corrected, these power variations may cause adjacent wavelengths to interfere (cross-talk) with each other. Interference between adjacent wavelengths of the optical signals is a potential source of transmission errors.

Typically, optical attenuators are used to control the power variations between the different optical signal wavelengths in optical communication systems. Some optical attenuators control the power variations between the different optical signal wavelengths by reflecting portions of specified optical signal wavelengths provided thereto.

Many optical attenuators include a plate attached to a substrate with torsional members (e. g., rods, springs). The plate is coated with a reflective material. The plate is moveable relative to the substrate by applying a torque to the torsional members. The movement of the plate attenuates optical signals provided thereto by reflecting portions thereof away from the transmission path of the optical communication system.

One problem with optical attenuators that include reflective plates relates to their insertion loss. Optical attenuators, in an "off" state, typically reflect optical signals with near zero attenuation. Near zero attenuation in the "off" state requires that the reflective plates have very flat surfaces. Reflective plates with very flat surfaces are difficult to fabricate.

Also, near zero attenuation in the "off" state requires that the plane of the reflective plate be positioned parallel to the substrate. However, for a torsional plate structure, the torsional members are fragile such that the equilibrium rotation of the reflective plate potentially drifts after each "on/off" cycle. Such drifting of the reflective plate affects its position plate relative to the substrate.

Thus, optical attenuators continue to be sought.

SUMMARY OF THE INVENTION

The present invention is directed to an optical attenuator having a structure in which a membrane covers a cavity formed on a substrate. The membrane is movable relative to the bottom surface of the cavity and constitutes a deformable mirror. Movement of the membrane relative to the bottom surface of the cavity attenuates optical signals impinging on the surface thereof. The movement of the membrane relative to the bottom surface of the cavity attenuates impinging optical signals by controlling the angle at which optical signals impinging off-axis are reflected from the membrane surface.

The membrane covering the cavity formed on the substrate is movable relative to the bottom surface of the cavity in response to an electrostatic field. The electrostatic field is generated by applying a bias voltage between the membrane and the bottom surface of the cavity formed on the substrate. The magnitude of the electrostatic field depends on the amount of the applied bias voltage.

Both the membrane and the substrate are preferably conductive so that the bias voltage may be applied across them to generate the electrostatic field. When either of the membrane or the substrate are insufficiently conductive to generate the electrostatic field, conductive layers are optionally formed on regions thereof. Such conductive layers are preferably formed on an overlying region of the membrane covering the cavity and on the bottom surface of the cavity formed in the substrate.

The substrate is made of a material typically used for integrated circuit fabrication. Examples of suitable substrate materials include silicon and quartz.

The membrane is made of one or more layers of material having physical properties (e.g., tensile strength, elastic properties, layer thickness) which permit membrane movement in response to the electrostatic field. Examples of suitable membrane materials include polysilicon, silicon nitride, silicon dioxide, and metals (e. g., gold).

The reflective properties of membranes made of insulating materials (e. g., silicon nitride) are enhanced with a layer of metal formed on the surface thereof. The metal layer would also constitute an electrode on the membrane.

The membrane optionally includes pores. The pores permit the removal of air in the cavity, facilitating movement of the membrane relative to the bottom surface of the cavity in response to the electrostatic field.

Other objects and features of the present invention will become apparent from the following detailed description considered in conjunction with the accompanying drawings. It is to be understood, however, that the drawings are designed solely for purposes of illustration and do not serve to limit the invention, for which reference should be made to the appended claims.

DETAILED DESCRIPTION

The present invention is directed to an optical attenuator useful as a component in an optical communication system. The optical communication system optionally includes a variety of devices (not shown) such as light sources, photodetectors, switches, modulators, amplifiers, and filters. Optical signals that are transmitted in the optical communication system have a plurality of different wavelengths (frequencies) one of which is typically directed at the optical attenuator.

Figure 1:
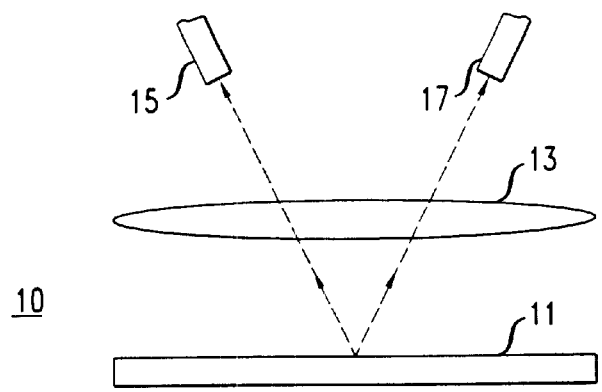
FIG. 1 shows an optical attenuator of the present invention coupled with an input optical fiber and an output optical fiber.

As shown in FIG. 1, the optical attenuator 10 includes a deformable mirror 11 which is coupled to an input optical fiber 15 and an output optical fiber 17. The optical signals transmitted in the optical communication system are provided to the optical attenuator 10 through input optical fiber 15. The deformable mirror 11 attenuates portions of the optical signals provided thereto. Thereafter, the attenuated optical signals are output from the optical attenuator 10 through output optical fiber 17. A lens 13 is optionally positioned between the deformable mirror 11 and the optical fibers 15, 17. The lens 13 collimates the input optical signals which are directed towards specified portions of the deformable mirror 11 and focuses the reflected beam generally toward the output optical fiber 17.

Figure 2:
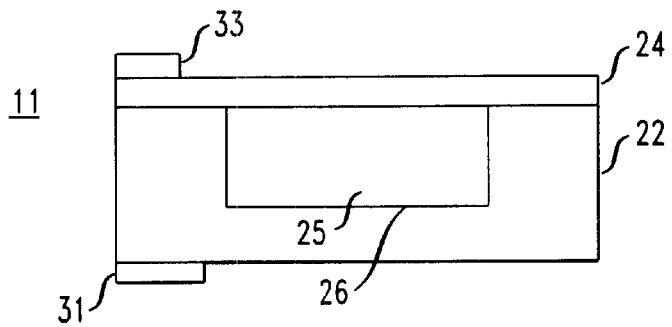
FIG. 2 is a cross-sectional view of the mirror assembly shown in FIG. 1 including a membrane covering a cavity formed on a substrate.

FIG. 2 is a cross-sectional view of the deformable mirror 11 shown in FIG. 1. The deformable mirror 11 has a structure in which a membrane 24 covers a cavity 25 formed on a substrate 22.

The membrane 24 which covers the cavity 25 formed on the substrate 22 is movable relative to a bottom surface 26 of the cavity 25. An electrostatic field is used to move the membrane 24.

The electrostatic field is generated by applying a bias voltage between the membrane 24 and the bottom surface 26 of the cavity 25 formed in the substrate 22. The magnitude of the electrostatic field generated between the membrane 24 and the bottom surface 26 of the cavity 25 depends on the amount of the applied bias voltage.

Figure 3:
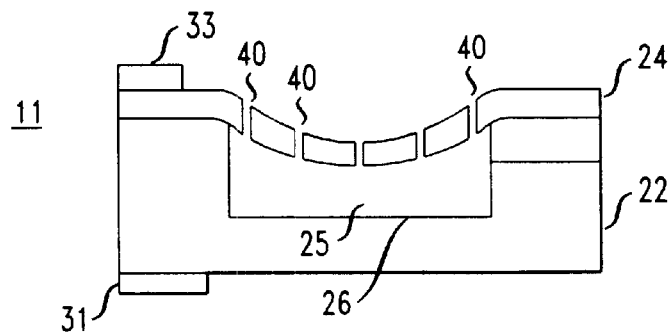
FIG. 3 is a cross-sectional view of the mirror assembly shown in FIG. 2 after an electrostatic field is generated between the membrane and the bottom surface of the cavity formed in the substrate.

FIG. 3 is a cross-sectional view of the deformable mirror 11 after the electrostatic field is generated between the membrane 24 and the bottom surface 26 of the cavity 25. Generating the electrostatic field between the membrane 24 and the bottom surface 26 of the cavity 25 pulls the membrane into the cavity 25.

Such movement of the membrane 24 relative to the bottom surface 26 of the cavity 25 controls the angle at which impinging optical signals (directed off-axis) are reflected from the membrane 24 surface. As such, the reflected optical signals are either directed at the output optical fiber 17, partially directed at the output optical fiber 17, or directed away from the output optical fiber 17.

The bias voltage is applied to both the membrane 24 and the substrate 22 from a voltage source (not shown). The voltage source (not shown) preferably applies the bias voltage to the membrane 24 and the substrate 22 via contacts 33, 31, respectively. The voltage source preferably applies a bias voltage less than about 50 volts.

The substrate 22 should be sufficiently conductive so that the desired electrostatic field is generated upon the application of the bias voltage to the substrate 22 and the membrane 24. When the substrate material is not sufficiently conductive the substrate is doped to provide the desired conductivity. For example, if the substrate is silicon, it is preferably doped with any Group III or Group V element, typically phosphorous or boron. Suitable doping methods include ion implantation and selective diffusion.

An insulating layer formed on the substrate (not shown) optionally electrically isolates the membrane from the substrate.

The size of the cavity 25 formed in the substrate depends on the dimensions of the substrate. However, the cavity 25 preferably has a height less than about 5 $\mu$m (micrometers). Cavity heights greater than about 5 $\mu$m are undesirable because large bias voltages (greater than about 50 volts) are needed to generate the electrostatic force between the membrane and the bottom surface of the cavity.

The membrane 24 is also conductive so that it moves in response to the applied electrostatic field. In addition, the membrane has reflectivity characteristics which reflect optical signals. Additionally, the membrane should have physical properties (e.g., tensile strength, elastic properties, layer thickness) which permit its movement in response to an electrostatic field.

When the membrane 24 is not sufficiently conductive to generate the electrostatic field, the membrane 24 has a multi-layer structure in which at least one of the layers is conductive. Suitable materials for the conductive layer include aluminum, platinum, tungsten, conducting silicon, ITO (indium-tin-oxide), gold, chromium/gold or titanium/gold.

The reflective properties of membranes made of insulating materials (e. g., silicon nitride) are enhanced with a layer of metal formed on the surface thereof. The metal layer would also constitute an electrode on the membrane.

The membrane 24 optionally includes pores 40, as shown in FIG. 3. The pores 40 permit the removal of air in the cavity 25, facilitating movement of the membrane 24 in response to the application of the electrostatic field. The pores 40 preferably have diameters less than about 10 $\mu$m.

Figure 4:
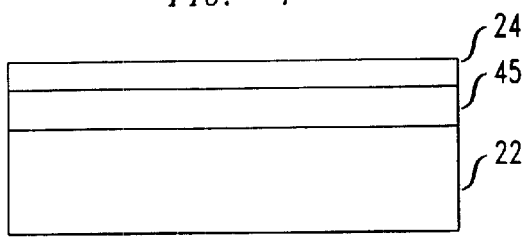
FIG. 4 is a cross-sectional view of a spacer layer and a membrane formed on a surface of a substrate.

The deformable mirror 11 could be fabricated using several methods. In one example, referring to FIG. 4, the deformable mirror is fabricated by providing a substrate 22 that is suitably prepared (i.e., doped, as appropriate) and cleaned. Suitable substrate materials include silicon, gallium arsenide, indium phosphide, germanium or indium tin oxide (ITO) coated glass.

A spacer layer 45 is formed on the substrate 22. A portion of the spacer layer 45 forms the cavity 25 region of the optical attenuator. The spacer layer 45 is preferably a material capable of being removed selectively after the membrane 24 is formed over it. Glass is the preferred material for this layer. Suitable examples include phosphosilicate glass (PSG), boron-phosphosilicate glass (BPSG), phosphotetraorthosilicate glass (PTEOS) or boron-phosphotetraorthosilicate glass (BPTEOS) that dissolve in solutions of hydrofluoric acid (HF), buffered HF (BHF), diluted HF, or diluted BHF. The spacer layer 45 is formed on the substrate 22 using any suitable method such as low pressure chemical vapor deposition (LPCVD).

After the spacer layer 45 is formed on the substrate 22, a membrane 24 is formed thereover. The membrane 24 is formed using any suitable method such as low pressure chemical vapor deposition (LPCVD). The membrane 24 is made of one or more layers of material which reflect optical signals. Examples of suitable membrane materials include polysilicon, silicon nitride, and silicon dioxide coated with a metal layer such as gold, titanium-palladium-gold, chromium-gold, and aluminum. Pure metal membranes could optionally be used but would exhibit greater mechanical hysteresis as compared to polysilicon for example.

Figure 5:
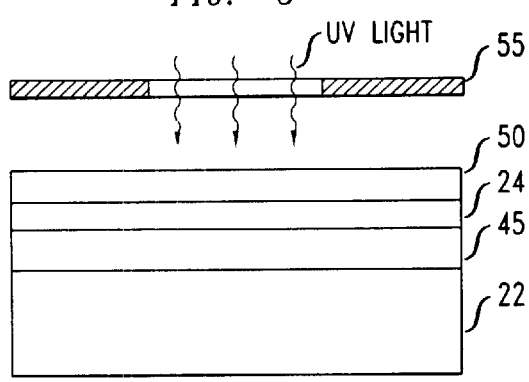
FIG. 5 is a cross-sectional view of the membrane shown in FIG. 4 after it is patterned using radiation sensitive material as an etch mask.

With reference to FIG. 5, the structure is then masked so the cavity can be defined in the spacer layer 45. Photolithographic techniques are used to define the cavity in the spacer layer 45. A layer of radiation sensitive material 50 (e. g., photoresist or photodefinable polyimide) is deposited on the membrane 24. Regions of the layer of radiation sensitive material 50 are patterned by selectively exposing such regions to radiation (e. g., ultraviolet light) using a mask 55.

After regions of the layer of radiation sensitive material 50 are exposed to radiation, they are developed by dissolving such regions in an appropriate solvent. The developed layer of radiation sensitive material 50 serves as an etch mask for patterning the membrane 24 (e. g., with pores).

The pattern exposed in the layer of radiation sensitive material 50 is transferred through the membrane 24 to the spacer layer 45 using an appropriate etching technique. Suitable etching techniques include plasma etching or reactive ion etching.

Figure 6:
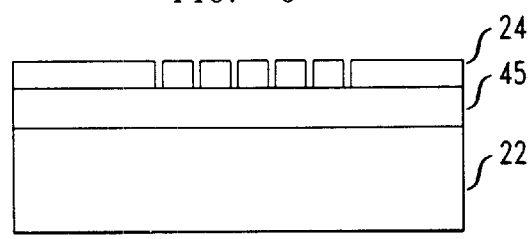
FIG. 6 depicts the membrane shown in FIG. 5 after the radiation sensitive material is removed therefrom.

After the membrane 24 is patterned, the remaining radiation sensitive material 50 is removed therefrom. The radiation sensitive material is removed by dissolving it in an appropriate solvent or a plasma etch. FIG. 6 depicts the substrate with the radiation sensitive material 50 removed from the membrane 24.

Figure 7:
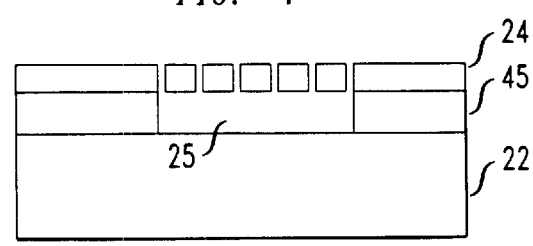
FIG. 7 is a cross-sectional view of the substrate depicted in FIG. 6 after the cavity is formed in the spacer layer using the membrane as an etch mask.

The cavity 25 is formed in the spacer layer 45 by isotropically etching the portions of the spacer layer exposed by the pattern formed in the membrane 24. To obtain isotropic etching as well as the necessary undercut to produce the desired cavity, a wet etchant is used. Various wet etchants may be used, for example hydrofluoric acid (HF). Etching proceeds laterally as well as vertically with the result shown in FIG. 7 wherein the cavity 25 is formed in a region of the spacer layer 45 below the membrane 24.

Conductive material 31, 33, shown in FIGS. 2–3, is deposited and patterned on the substrate 22 and, if required, on the membrane 24, respectively.

The following example is provided to illustrate a specific embodiment of the present invention.

EXAMPLE 1

An optical attenuator having the structure depicted in FIG. 2 was simulated. The cavity was assumed to be circular with a diameter of about 1000 $\mu$m. The height of the cavity was assumed to be about 5 $\mu$m. The membrane covering the cavity was assumed to be a layer of silicon nitride about 0.2 $\mu$m thick and covered with a thin gold layer. The silicon nitride had a tensile stress assumed to be about 50 MPa. A bias voltage of about 28 volts was assumed to be applied between the metal on the silicon nitride membrane and the bottom surface of the cavity. Calculations performed using a bias voltage of about 28 volts determined that the midpoint of the silicon nitride membrane would be depressed about 1.5 $\mu$m into the cavity (about 30% of the cavity height).

The input and the output optical fibers were located about 4 mm (millimeters) away from the membrane surface and arranged so that the optical signals impinged on the membrane about 275 $\mu$m away from the center point of the cavity. The depressing of the membrane caused the reflected and focused optical signals to be displaced a lateral distance of about 30 $\mu$m. The core diameter of optical fibers was about 8 $\mu$m, so for this example, essentially all of the optical signal is reflected to the output fiber. However, the value for the bias voltage is variable, so the depression of the membrane and thus the lateral shift of the reflected and focussed optical signals depends thereon. Thus, for the above example, the optical attenuator can function to displace the reflected and focussed beam over a range of bias voltages less than about 28 volts.

The invention claimed is:

1. An optical attenuator, comprising:
   a substrate, wherein the substrate has a cavity therein; and
   a membrane, wherein the membrane covers the cavity in the substrate, wherein the membrane is adapted to receive optical signals, and wherein the membrane is configured to have a region for receiving optical signals that is removed from the center of the cavity.

2. The optical attenuator of claim 1 wherein the membrane attenuates the at least portion of the received optical signals in response to an electrostatic field generated between the membrane and a bottom surface of the cavity in the substrate.

3. The optical attenuator of claim 2 wherein the electrostatic field is generated by applying a bias voltage between the membrane and the bottom surface of the cavity.

4. The optical attenuator of claim 3 wherein the bias voltage applied between the membrane and the bottom surface of the cavity is less than about 50 volts.

5. The optical attenuator of claim 1 wherein the cavity in the substrate has a height less than about 5 $\mu$m.

6. The optical attenuator of claim 1 wherein the membrane has pores therethrough.

7. The optical attenuator of claim 6 wherein the pores have a diameter less than about 10 $\mu$m.

8. An optical communication system, comprising:
   an optical attenuator, wherein the optical attenuator includes a substrate and a membrane, wherein the substrate has a cavity therein, wherein the membrane covers the cavity in the substrate, wherein the membrane is adapted to receive optical signals, and wherein the membrane is configured to have a region for receiving optical signals that is removed from the center of the membrane.

9. A method of attenuating optical signals, comprising the steps of:
   providing an optical attenuator, wherein the optical attenuator includes a substrate and a membrane, wherein the substrate has a cavity therein, wherein the membrane covers the cavity in the substrate, and wherein the membrane is adapted to receive optical signals;
   generating an electrostatic field between the membrane and a bottom surface of the cavity in response to a control signal, wherein the electrostatic field causes the membrane to move from a first orientation to a second orientation; and
   directing the optical signal to a region of the membrane that is removed from the center of the membrane when the membrane is in the second orientation.

10. The method of claim 9 wherein the control signal is a bias voltage.

11. The method of claim 10 wherein the bias voltage is less than about 50 volts.

12. The method of claim 9 wherein the cavity in the substrate has a height less than about 5 $\mu$m.

13. The method of claim 9 wherein the membrane has pores therethrough.

14. The method of claim 13 wherein the pores have a diameter less than about 10 μm.

15. An optical attenuator, comprising:

a substrate, wherein the substrate has a cavity therein; and a membrane, wherein the membrane covers the cavity in the substrate, wherein the membrane is adapted to receive optical signals, and wherein the membrane is configured to have a region for receiving optical signals that is removed from the center of the cavity wherein the membrane comprises one or more material layers and wherein the one or more material layers are selected from the group consisting of silicon nitride, silicon dioxide, polysilicon, and a metal.

16. A method of attenuating optical signals, comprising the steps of:

providing an optical attenuator, wherein the optical attenuator includes a substrate and a membrane, wherein the substrate has a cavity therein, wherein the membrane covers the cavity in the substrate, and wherein the membrane is adapted to receive optical signals;

generating an electrostatic field between the membrane and a bottom surface of the cavity in response to a control signal, wherein the electrostatic field causes the membrane to move from a first orientation to a second orientation; and directing the optical signal to a region of the membrane that is removed from the center of the membrane when the membrane is in the second orientation wherein the membrane comprises one or more material layers and wherein the one or more material layers are selected from the group consisting of silicon nitride, silicon dioxide, polysilicon, and a metal.

* * * * *